Aug. 5, 1947.  J. FERRANTE  2,425,235

FILTER

Filed July 16, 1943

INVENTOR
John Ferrante,
BY Johnson + Kline
ATTORNEYS

Patented Aug. 5, 1947

2,425,235

UNITED STATES PATENT OFFICE 2,425,235

FILTER

John Ferrante, Johnstown, N. Y., assignor to Kenlea Manufacturing Company, Johnstown, N. Y., a corporation of New York Application July 16, 1943, Serial No. 495,059

12 Claims. (Cl. 183—51)

This invention relates to filters, and more particularly to the provision of an improved filter cloth.

It is many times desirous to have a fibrous filter for instance to filter air. Such filters have been used heretofore in the making of window screens so as to trap dust and foreign particles and yet allow air to pass into a room. The difficulty with such filter screens has been that the cloth of which they have been made is flimsy and soon becomes bellied or bowed and cannot be conveniently cleaned. Filter cloth used for other purposes has the same drawback of not being stiff or self-sustaining.

An object of the present invention is to provide a filter cloth which is substantially rigid and self-sustaining, and thus will maintain its shape through long periods of use and yet which is effective to trap dust and foreign particles in the air or other fluid passing through it.

According to the present invention, this filter cloth comprises a wire mesh preferably formed by weaving comparatively fine metal wires which may, if desired, be galvanized. The wire mesh may be made by braiding the wires together or by cross-laying them in any desired manner. The wires forming the screen are held together at their intersections, as by the application of a cementitious material, and this has the effect of resisting stretching or attenuation of the wire cloth when a pull is applied on the bias. It also effectively holds the filter cloth against unraveling when it is slit or cut into the desired size and shape.

The wire mesh, according to the present invention, is covered with flocking material, and for this purpose the cementitious material employed to anchor the intersections of the wire together may also be made adhesive so as to receive and hold the fibers of the flocking material, or, if desired, a special application of adhesive material may be applied to the wire cloth after the cementitious material is dried, hardened, or otherwise set. The adhesive material and/or the cementitious material is preferably of such composition or is so applied that it will adhere to the wire only and not form a film across the interstices of the cloth.

The flocking material preferably has fibers of such length and is applied in such quantity that some of the fibers at least extend over and substantially cover the interstices in the mesh. Each of these fibers, being resilient, deflects with the air currents impinging upon the cloth and allows the air to pass into a room or chamber, but in doing so picks up and holds any dust or particles of foreign material with which the air is laden. The flocking cloth of the present invention, therefore, forms in a sense a valve which permits the air to pass through the interstices of the screen, but which ensnares dust and foreign particles carried by the air. Yet having as its base or body wires of appropriate stiffness, it does not belly or bow under the force of the fluid stream passing through it.

The screen of the present invention also may be advantageously used in screening liquids, and in such case the adhesive and/or cementitious material is made to be impervious to the liquids with which the filter is to be used. And one or more layers of the cloth may be used in a pile if greater filtering action is required, or a strip may be formed in a roll to serve as a replaceable cartridge for use in a suitable container.

Other features and advantages will hereinafter appear.

In the accompanying drawings which illustrate one form of the invention, that at present preferred—

Figure 1 is an elevation of a screen such as might be used in the window of a home, office, or the like.

Figure 1:
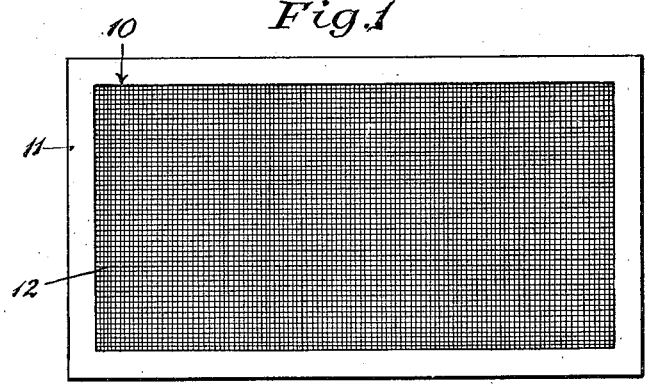
Figure 2:
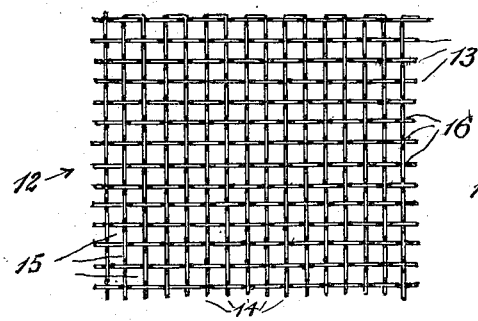
Fig. 2 is a plan view of a wire mesh used to make the filter of the present invention.

As shown in Fig. 1, the article of the present invention may be used to make a window screen 10 having a frame 11 and a sheet of screening material 12 secured to the frame in any suitable manner. This screen material preferably comprises as a body or base a wire mesh formed of warp wires 13 and weft wires 14 interwoven as shown in Fig. 2, although the wires may be braided or cross-laid if desired. The wires 13 and 14 have a comparatively small diameter and are rather closely woven so as to provide relatively small interstices 15.

Figure 3:
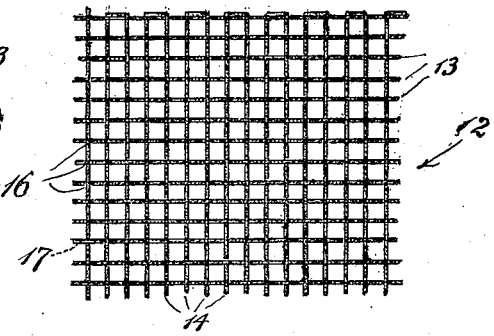
Fig. 3 is a similar view, showing diagrammatically the wire mesh with the adhesive applied thereto.

To maintain the desired shape of the screen or mesh, the wires 13 and 14 may be secured together at their intersections 16 by the application of cementitious material 17 diagrammatically shown in Fig. 3. This cementitious material may be applied to the screen by dipping or spraying and it may be a composition of phenol resin or other resin; and it may be either thermoplastic or heat set if desired. By securing the wires 13 and 14 together at their intersections, it is possible to cut into the wire or to cut off a piece of any desired size or shape without the wires fraying.

After the cementitious material 17 is applied to the wire, the wire is provided with a covering of flocking material. If desired, the cementitious material 17 may also be of an adhesive character so that when the flocking material 18 is deposited on the wires, the fibers will adhere to the cementitious material. However, if desired, a separate coating of adhesive material may be applied to the wire just before the flocking operation.

To make the filter of the present invention, the flocking material is so selected that the fibers are of such length and in such quantity that when they are adhered to the wire they extend over and bridge the space between adjacent wires and thus substantially fill the interstices of the wire. The fibers 19 which extend over the interstices are flexible and yield slightly to the passage of air impinging upon the screen, and thus pass a considerable quantity of air or other fluid, notwithstanding the fact that they appear to cover quite completely the interstices of the wire. As air passes through the filter, dust and other foreign particles are caught upon the fibers and prevented from freely passing through. The fibers 19 of the flocking material may be dyed or otherwise colored either before or after they are applied to the screen.

The wires 13 and 14 may be of any suitable material and if made of iron may be galvanized or otherwise treated to be rust-resistant.

In addition to acting to secure the intersections of the wire together and the additional optional function of serving to anchor the fibers to the wire, the cementitious material may also provide a waterproof coating for the wires tending to prevent their being attacked by oxidation or other chemical action.

Figure 5:
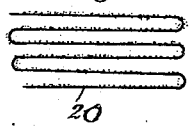
Fig. 5 is an edge view showing several layers of the filtering material in a pile.
Figure 4:
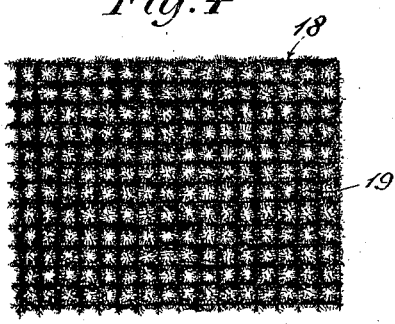
Fig. 4 is a view similar to Figs. 2 and 3, but showing the screen with flocking material applied thereto.
Figure 6:
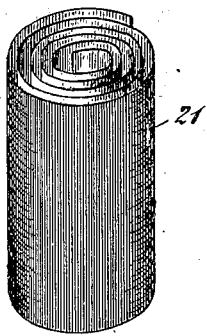
Fig. 6 is a perspective view of the strip wound in a roll.

In making a screen or other filter, it is merely necessary to cut or blank from a strip of filter material made according to the present invention a piece of the desired size and shape and suitably mount or secure it across the path of the fluid to be filtered. As shown in Fig. 5, several layers of the material may be used in a pile 20 for greater filtering action, or as shown in Fig. 6 a strip of the material may be wound into a roll or cartridge 21 for use in a suitable container as in an air or oil filter.

Variations and modifications may be made within the scope of this invention and portions of the improvements may be used without others.

I claim:

1. A filtering medium comprising a wire mesh substantially entirely coated with a pile of flocking material.

2. A filtering medium comprising a woven wire mesh substantially entirely covered on both sides with a pile of flocking material adhering to the wires of the mesh.

3. A filtering medium comprising a woven wire mesh substantially entirely covered with a pile of flocking material adhering to the wires of the mesh, the fibers of the flocking material being relatively short and of such length as to substantially fill the interstices of the wire mesh.

4. A filtering medium comprising a woven wire mesh having the intersections of the wire secured together and covered with a pile of relatively short and stiff flocking material adhering to the wires.

5. A filtering medium comprising a woven wire mesh having the intersections of the wires secured together by cementitious material, said mesh being covered all over with a pile of flocking material adhering to the wires of the mesh.

6. A filtering medium comprising a woven wire mesh having the intersections of the wires secured together by cementitious material, said mesh being covered with a pile of flocking material secured to the wires of the mesh by said cementitious material.

7. A filtering medium comprising a woven wire mesh having the intersections of the wires secured together by cementitious material, said mesh being substantially entirely covered with a pile of flocking material secured to the wires of the mesh by a coating of adhesive material.

8. A filtering medium comprising a woven wire mesh substantially entirely provided with a coating of resinous material and covered by a pile of flocking material secured to the wires.

9. A filtering medium comprising a woven wire mesh substantially entirely provided with a coating of resinous material and covered by a pile of flocking material, said flocking material being secured to the wires of the mesh by said coating of resinous material.

10. A filtering medium comprising a galvanized woven wire mesh having a coating of adhesive material and a covering of flocking material secured to the wires of the mesh by said adhesive.

11. A filter comprising a sheet of wire screening having a covering of flocking material secured to the wires of the screening, the fibers of the cover extending over and partially closing the interstices of the wire.

12. A filter comprising a strip of wire screening having a covering of flocking material secured to the wires and wound into a roll to form a filter cartridge.

JOHN FERRANTE.

REFERENCES CITED

The following references are of record in the file of this patent:

UNITED STATES PATENTS

| Number | Name | Date |
|---|---|---|
| 741,210 | Young | Oct. 13, 1903 |
| 945,632 | Strohl | Jan. 4, 1910 |
| 1,700,126 | Goodloe | Jan. 29, 1929 |